Oct. 22, 1940.     G. SNYDER     2,218,627
BUMPER
Filed June 19, 1939

Inventors
George Snyder

Patented Oct. 22, 1940

2,218,627

UNITED STATES PATENT OFFICE 2,218,627

BUMPER

George Snyder, Detroit, Mich., assignor to General Motors Corporation, Detroit, Mich., a corporation of Delaware Application June 19, 1939, Serial No. 279,852

3 Claims. (Cl. 293—55)

This invention relates to an improved bumper construction to guard against shock and injury to a motor vehicle.

It is an object of the invention to provide a neat appearing and inexpensive vehicle end construction with a wide range of protection against damage.

A further object is to support the main impact bar from vertical guard posts having concealed mountings and being so constructed and arranged as to fend blows and preclude interlocking with the bumper of another car.

Figure 1:
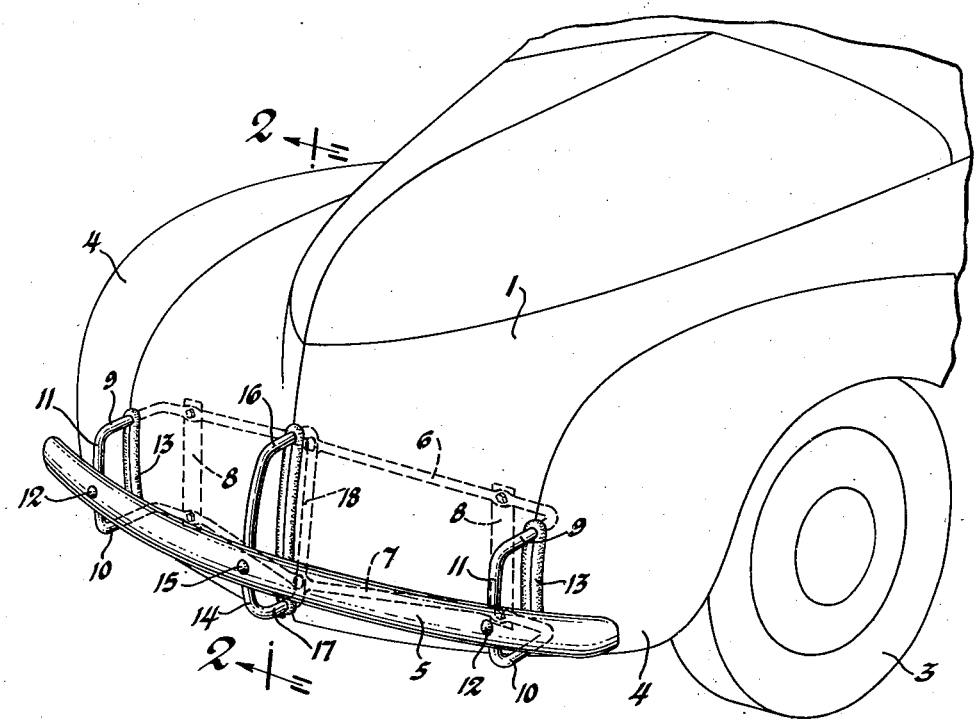
Figure 2:
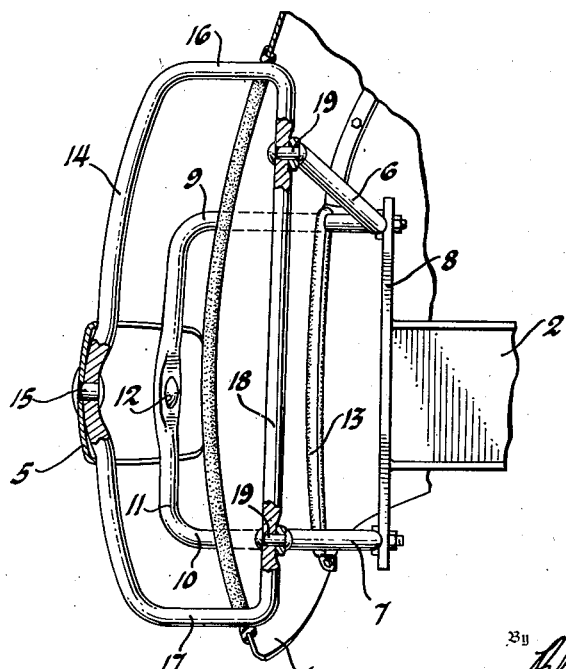

Additional objects will become apparent during the course of the following specification having reference to the preferred embodiment of the invention as shown in the drawing, wherein Figure 1 is a perspective view of the front end of a motor vehicle and Figure 2 is a vertical section taken on line 2—2 of Figure 1.

Either or both the front and the rear of the vehicle may have the improved structure applied thereto. In the case of the front end illustrated in the drawing the body can be considered as including the front and side wall paneling 1 enclosing the engine compartment and extending downwardly at the front below and in concealing relation with the vehicle frame 2 terminating behind the panel 1. As customary the frame 2 is supported upon wheels 3 provided with mud guards or splash fenders 4 shaped to merge into the panel 1.

The fenders and wall paneling are usually formed of sheet metal and are not relied upon for imparting structural strength to the vehicle as a whole. They are shaped to pleasing outlines and their primary purpose is to conceal the structural and working parts. To guard them against crushing blows a bumper or main impact bar 5 of forwardly bowed shape, extends transversely across the vehicle and is supported free of the sheet metal parts upon the main frame of the vehicle. The support for the impact bar 5 is illustrated as an endless or elongated loop of round bar stock having its major portion hidden behind the sheet metal front panel with angularly bent ends projecting through the panel for attachment to the end portions of the impact bar.

The supporting loop includes a pair of vertically spaced rods 6 and 7 extending transversely across the vehicle frame and being secured thereto by frame brackets 8. At opposite ends the rods 6 and 7 have the outturned end portions 9 and 10, respectively, which project through openings in the wall panel 1 and are joined by the vertical post 11 having the main impact bar 5 secured thereto by bolts or rivets 12. Each opening through the panel is shown as an elongated slot bounded by a rubber molding 13. Each closed and outwardly bent end of the loop, as viewed from the exterior of the wall panel, has the appearance of a U-shaped member set in a vertical plane with the vertical post 11 or base of the U of a height greater than the main impact bar so as to extend above and below the top and bottom edges of the bar and thereby increase the range of protection afforded. The integral arms 9 and 10 prevent the guard post 11 from dropping behind and becoming interlocked with the bumper of another car.

For additional protection a central guard and support may be employed which can be in the nature of a vertically disposed loop comprising a guard post 14 secured by a rivet 15 to the impact bar 5 and provided at the top and bottom with integral arms 16 and 17 extending through the panel 1 and being joined by the vertical connecting rod 18 attached by rivets 19 to the central portions of the vertically spaced rods 6 and 7. Optionally the central guard may be simply a vertical plate extending through the panel and connecting the bumper bar and supporting bars intermediate the end guards 11—11. In any event the central guard should be somewhat larger than the end guards for a pleasing appearance and should extend ahead of the end guards for proper cooperation with the forwardly bowed bumper bar 5 as is best seen in Figure 2.

I claim:

1. In a motor vehicle having a sheet metal end wall concealing the vehicle chassis, a pair of vertically spaced transversely extending bumper supporting bars mounted on the chassis behind the inner face of the end wall and having angularly turned end extremities projected longitudinally near opposite sides of the vehicle through openings in the end wall, vertical connecting pieces between the end extremities at each side of the vehicle and an impact bar supported by said connecting pieces transversely across the exterior face of the end wall.

2. The structure defined by claim 1 having the bar connecting pieces of greater dimension vertically than the impact bar.

3. In a motor vehicle having a vertical end wall extending below and concealing the vehicle chassis, a bumper supporting member having a portion projected transversely across and supported by the chassis and longitudinally extending terminal portions at each side of the vehicle projecting through openings in the end wall and an impact member mounted on said terminal portions in protective relation to the end wall, said terminal mounting portions being of greater vertical dimension than the impact member and thereby increasing the range of protection.

GEORGE SNYDER.